United States Patent
Lee et al.

(10) Patent No.: US 8,113,045 B1
(45) Date of Patent: Feb. 14, 2012

(54) MEANS FOR IMPROVING INERTIAL MEASUREMENT UNIT RELIABILITY FOR CANNON LAUNCHED APPLICATIONS

(75) Inventors: Jyeching R. Lee, Raritan, NJ (US); Jennifer A. Cordes, Rockaway, NJ (US); Michael S. L. Hollis, Flanders, NJ (US); Shana L. Groeschler, Passaic, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 251 days.

(21) Appl. No.: 12/487,145

(22) Filed: Jun. 18, 2009

Related U.S. Application Data

(60) Provisional application No. 61/179,160, filed on May 18, 2009.

(51) Int. Cl.
*G01L 5/14* (2006.01)
*G01P 3/00* (2006.01)

(52) U.S. Cl. .......................................... 73/167; 73/526

(58) Field of Classification Search .............. 73/1.75, 73/1.77, 1.78, 526; 74/5.1, 5.22; 33/316, 33/318; 102/384; 89/202
See application file for complete search history.

(56) References Cited

U.S. PATENT DOCUMENTS

| | | | |
|---|---|---|---|
| 2002/0175020 A1* | 11/2002 | Corrigan et al. | 181/111 |
| 2007/0074570 A1* | 4/2007 | Braman et al. | 73/504.14 |
| 2010/0037694 A1* | 2/2010 | Grossman | 73/526 |

OTHER PUBLICATIONS

Unknown, Title: Materials, Solid Silicone Sheet Products, Date: Apr. 3, 2008 from Wayback Machine Internet Archive, Publisher: Stockwell Elastomerics, Inc., Web site: http://www.stockwell.com/pages/materials_silicone.php, Captured: Sep. 8, 2011.*

* cited by examiner

*Primary Examiner* — Lisa Caputo
*Assistant Examiner* — Roger Hernandez-Prewitt
(74) *Attorney, Agent, or Firm* — Michael C. Sachs

(57) ABSTRACT

This invention provides a shock mitigation means that attenuates the high frequency energy transmitted to the floating element of an inertial measurement unit (IMU) device in a cannon launched guided projectile or cannon launched munition improving the ability of the IMU to survive the extreme forces of such cannon launched environment. The invention utilizes a crushable foam mitigator located in the IMU device's housing to interfere and apply a compressive force to the floating element of the IMU device, plus a rubber pad attenuator element placed above the foam mitigator to further tailor the transmission of shock energy to the floating element in the IMU device.

2 Claims, 5 Drawing Sheets

US 8,113,045 B1

MEANS FOR IMPROVING INERTIAL MEASUREMENT UNIT RELIABILITY FOR CANNON LAUNCHED APPLICATIONS

CROSS REFERENCE TO RELATED APPLICATIONS

This application claims benefit under 35USC119 (e) of the filing date of provisional application 61/179,160 filed May 18, 2009.

U.S. GOVERNMENT INTEREST

The inventions described herein may be made, used, or licensed by or for the U.S. Government for U.S. Government purposes.

BACKGROUND OF INVENTION

The invention relates in general to ballistic munitions and in particular to ballistic projectiles that measure conditions in a launching tube and in the exterior flight environment.

The United States military has sought to ensure and enhance reliability in various guided projectiles which contain an inertial measurement unit (IMU). An IMU is a critical part of any flight control system which helps allow for proper guidance of the airframe. Artillery or tank cannon launching of guided projectiles has created a plethora of issues regarding the ruggedness of an IMU. One such means of improving the reliability of the IMU is to increase the support to its sensing element, during the cannon launch phase of the projectile flight. Once the projectile is in free-flight, the sensing element is allowed to float and function as intended. (In this specification, the sensing element may also at times be referred to as a "floating element").

SUMMARY AND OBJECTS OF THE INVENTION

The invention provides a means of improving the ability of an IMU to survive a cannon launching environment. The cannon launching environment applies extreme forces in all directions to the sensing element of the IMU. Said forces contain a spectrum of frequencies that can run as high as hundreds of thousands of cycles per second (Hz). This invention intends on applying a means of restricting motion of the sensing element of the IMU such that the device will withstand the period of cannon launching. Post cannon launching, the device will be allowed to float as designed, and function as it was originally intended.

The invention comprises a shock mitigation device that attenuates the high frequency energy transmitted to the floating element of an IMU in a cannon launched guided projectile. The mitigator can be a crushable foam, e.g., element that initially applies an interference force to the floating element of the IMU. During the time of cannon launch, the floating element compresses such foam. The foam is designed such that only under gun launch loads would it be stressed to the point of the inelastic yield range of the material and thus collapse, absorbing the impact energy. After the transient period of cannon launch, the floating element is restored to its original position as designed. The foam would be permanently deformed after the set back event and therefore would provide the space required to allow the floating element to again move freely during the exterior flight phase.

Therefore, it is an object of this invention to provide means of improving the ability of an IMU in a projectile or munition to survive the extreme forces of a cannon launching environment.

It is another object of this invention to provide a shock mitigation device that attenuates the high frequency energy transmitted to the floating element of an IMU in a cannon launched guided projectile.

Further objects, features, and advantages thereof will become more apparent, and the invention may be better understood, from the following description of the preferred embodiments taken in conjunction with the accompanying drawings. In the drawings, which are not necessarily to scale, like or corresponding parts are denoted by corresponding reference numerals.

BRIEF DESCRIPTION OF THE DRAWINGS

FIG. 2C shows the shape of the foam element before being subject to launch conditions while

FIG. 3C shows the shape of the foam element (and rubber pad assembly) before being subject to launch conditions while

DETAILED DESCRIPTION

Figure 1A:
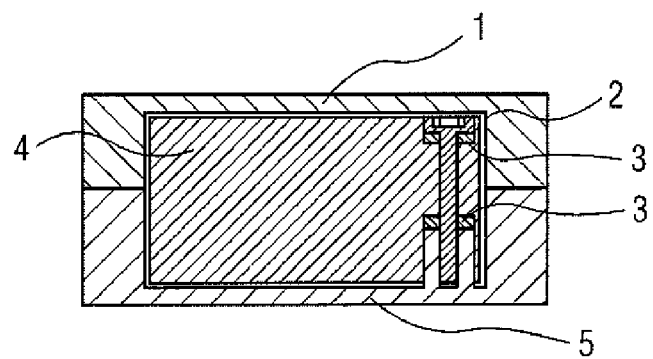
FIG. 1A is a sectional and FIG. 1B is an exploded view of the IMU detailing the floating element and the elastomeric isolators.
Figure 1B:
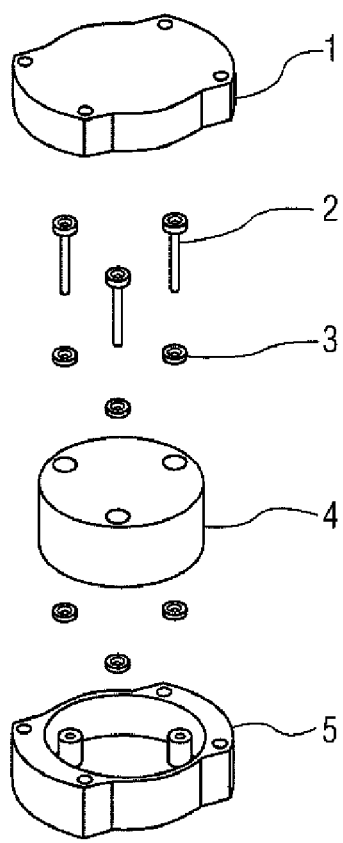

FIG. 1A is an assembled view and FIG. 1B is an exploded view showing one embodiment of an IMU. The housing top 1 is attached to the housing bottom 5 by some means. Within the housing, the floating element 4 which senses motion is constrained by the rails provided by bolts 2 and the proximity of the housing. Additionally, the elastomeric isolators 3 provide shock absorption and allow axial translation of the floating element 4 within the housing.

Figure 2A:
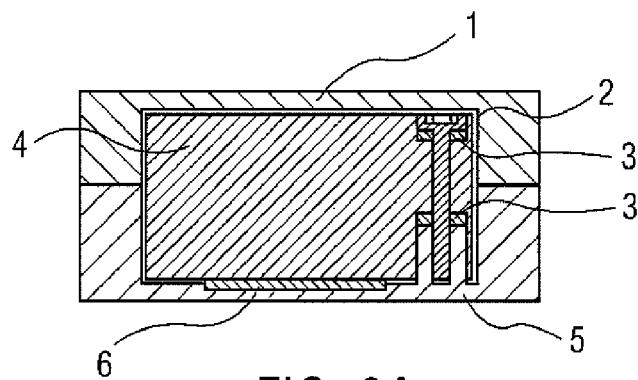
FIGS. 2A and 2B show the addition and location of a crushable foam element 6.
Figure 2B:
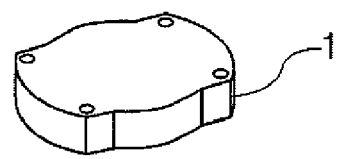
Figure 2B:
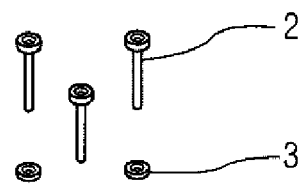
Figure 2B:
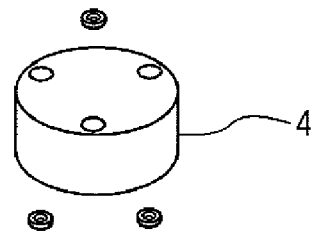
Figure 2B:
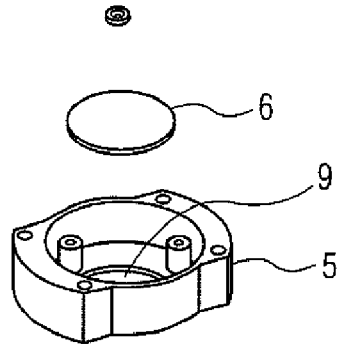
Figure 2C:
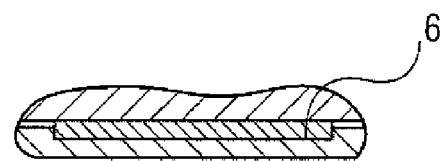
Figure 2D:
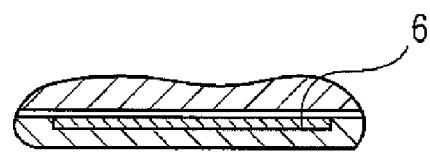
FIG. 2D shows the shape of the foam element crushed, after being subject to launch conditions.

FIGS. 2A and 2B show an embodiment of the invention which also includes a means of initially restricting the floating elements motion, specifically axial translation. A crushable foam mitigator 6 is now included, located at the bottom of the housing 5 (sized to be able to fit inside recessed cavity 9 of housing bottom) such that the mitigator 6 interferes and applies a compressive force to the floating element 4. During cannon launch, the floating element 4 will permanently deform the mitigator 6. This is shown by FIG. 2D, which is after launch, as opposed to FIG. 2C which is before launch. The deforming action will absorb high frequency shock energy that is harmful to the floating element 4. Additionally, the deformation will allow the floating element 4 to return to a floating state post cannon launch, and thereafter to perform as normal.

Figure 3A:
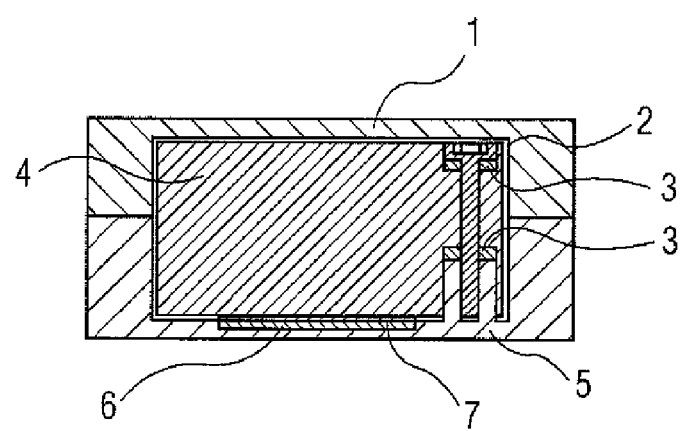
FIGS. 3A and 3B show the further addition and location of a rubber pad assembly 7, to the FIGS. 2A and 2B device.
Figure 3B:
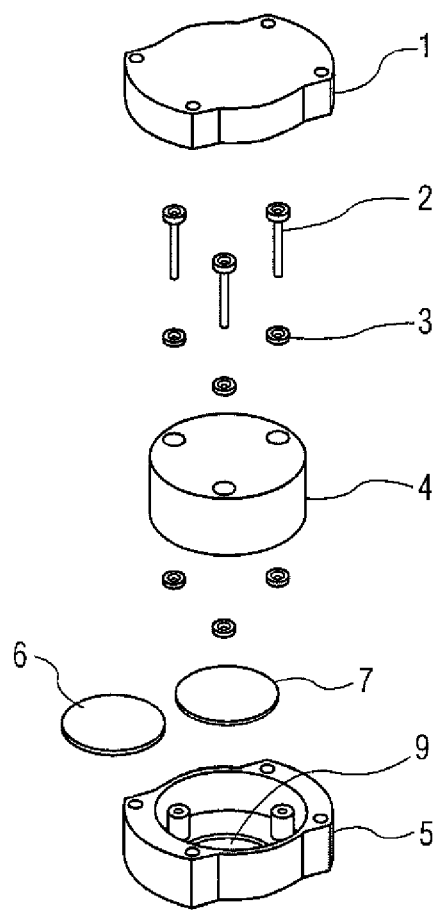
Figure 3C:
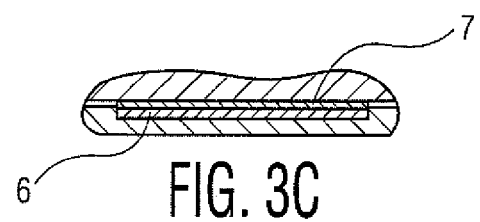
Figure 3D:
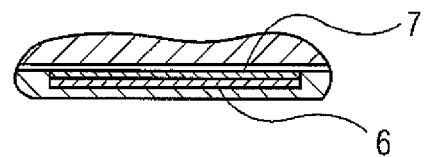
FIG. 3D shows the shape of the foam element crushed (and view of the rubber pad assembly), after being subject to launch conditions.

FIGS. 3A and 3B show a further embodiment of the invention which now also includes an attenuator 7 (also sized to be able to fit in recessed cavity 9 of housing bottom placed above mitigator 6), whereby such series of mitigator and attenuator elements can further be used to tailor the transmission of shock energy to the floating element 4. A crushable foam element 6 and a rubber pad attenuator element 7 can be located at the housing bottom 5 of an IMU unit such that the assembly interferes with the floating element, applying a compressive force. (Such a mitigator 6 and attenuator 7 assembly can be referred to herein by the numeral 8). During cannon launch, the floating element will permanently deform the crushable foam 6 (as shown by FIG. 3D after launch as compared to FIG. 3C before launch), while the rubber in 7 will dampen oscillatory shock transmitted to the floating element. Since the foam is deformed, the floating element will return to its original position and have the room to perform as desired. In one application of this invention, for the Excaliber projectile, the launch environment can include 16,000 G's of force. For such application a rubber, item 7, with durameter 30-80 might produce the intended attenuation of shock signals. The crushable foam 6 used can be metallic or polymeric, as long as the foam is permanently deformed. A suitable type of crushable foam might be aluminum or copper foam.

Figure 4:
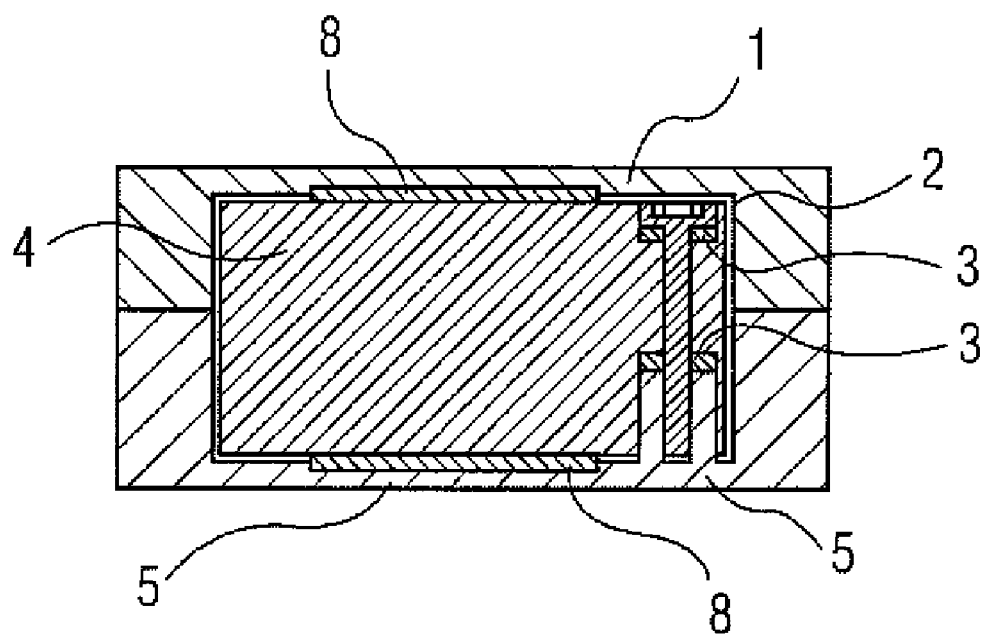
FIG. 4 shows a possible future location of a mitigator assembly, having crushable foam elements 6 both at top and bottom of the assembly (and possibly only at the top, if changed).

FIG. 4 shows another embodiment of the invention which might be adapted such that mitigator and attenuator assemblies 8 may be mounted within both top 1 and bottom 5 of an IMU housing. (Alternatively, a single mitigator and attenuator assembly 8 could be mounted only in the top 1. Similarly, only the mitigator 6 without attenuator 7 might be mounted in top, bottom, or both top and bottom, of an IMU housing). The bottom-most assembly 8 will absorb shock as mentioned in the previous paragraph during the set-back portion of the cannon launch event. However, the set-forward event of the cannon launch event may also require some attenuation of the high frequency shock energy associated with this aspect of cannon launch. (The set-forward event occurs when the projectile leaves the cannon tube, and the stored energy of the compressed projectile is released in a spring-like fashion. The shock energy at this interval is generally much lower than the energy associated with the set-back event).

While the invention has been described with reference to certain preferred embodiments, numerous changes, alterations and modifications to the described embodiments are possible without departing from the spirit and scope of the invention as defined in the appended claims, and equivalents thereof. For example, while an IMU system has been described here above, the shock mitigator and attenuator system hereof might also be applied to various fuzing devices, guidance electronics, and other types of sensor systems, as a means of protecting these systems by tailoring the transmitted shock of a cannon launch, and therefore improving reliability.

What is claimed is:

1. A shock mitigation and attenuation means for an IMU device of a projectile or munition, said IMU device comprising a floating element in between a top housing part and a bottom IMU housing part, said shock mitigation and attenuation means to enable such IMU device to survive the extreme forces of a cannon launching, said shock mitigation and attenuation means having a first side in contact with a housing part and a second side in contact with the IMU device, said shock mitigation and attenuation means comprising a crushable foam mitigator mounted in one IMU housing part to interfere with and apply a compressive force to the floating element of the IMU device, said foam mitigator also including a rubber pad attenuator element mounted therein between the IMU device and the crushable foam mitigator to further tailor the transmission of shock energy to the floating element in the IMU device, and wherein said mitigator element comprises aluminum foam.

2. A shock mitigation and attenuation means for an IMU device of a projectile or munition, said IMU device comprising a floating element in between a top housing part and a bottom IMU housing part, said shock mitigation and attenuation means to enable such IMU device to survive the extreme forces of a cannon launching, said shock mitigation and attenuation means having a first side in contact with a housing part and a second side in contact with the IMU device, said shock mitigation and attenuation means comprising a crushable foam mitigator mounted in one IMU housing part to interfere with and apply a compressive force to the floating element of the IMU device, said foam mitigator also including a rubber pad attenuator element mounted therein between the IMU device and the crushable foam mitigator to further tailor the transmission of shock energy to the floating element in the IMU device, and wherein said mitigator element comprises copper foam.

* * * * *